United States Patent
Durvasula et al.

(10) Patent No.: US 10,970,418 B2
(45) Date of Patent: Apr. 6, 2021

(54) SYSTEM AND METHOD FOR ANONYMIZED DATA REPOSITORIES

(71) Applicant: ServiceNow, Inc., Santa Clara, CA (US)

(72) Inventors: Sreenivas Durvasula, Hyderabad (IN); Prabodh Saha, Hyperdad (IN); Amitav Mohanty, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 178 days.

(21) Appl. No.: 16/110,312

(22) Filed: Aug. 23, 2018

(65) Prior Publication Data
US 2020/0065521 A1 Feb. 27, 2020

(51) Int. Cl.
G06F 21/62 (2013.01)
H04L 29/06 (2006.01)

(52) U.S. Cl.
CPC ...... *G06F 21/6254* (2013.01); *H04L 63/0421* (2013.01)

(58) Field of Classification Search
CPC .......... H04L 63/0421; G06F 21/6254
See application file for complete search history.

(56) References Cited

U.S. PATENT DOCUMENTS

| | | | |
|---|---|---|---|
| 6,321,229 B1 | 11/2001 | Goldman | |
| 7,020,706 B2 | 3/2006 | Cates | |
| 7,593,548 B2 | 9/2009 | Dharmarajan et al. | |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |
| 8,612,408 B2 | 12/2013 | Trinon | |
| 8,646,093 B2 | 2/2014 | Myers | |

(Continued)

FOREIGN PATENT DOCUMENTS

| CA | 2846471 A1 | 2/2013 |
|---|---|---|
| WO | 2018004236 A1 | 1/2018 |

OTHER PUBLICATIONS

Kerkri et al.; "An approach for integrating heterogeneous information sources in a medical data warehouse", Journal of Medical Systems, vol. 25, No. 3, Jan. 1, 2001; pp. 167-176 (XP055038699).

(Continued)

*Primary Examiner* — Baotran N To
(74) *Attorney, Agent, or Firm* — Fletcher Yoder PC

(57) ABSTRACT

A computing system includes an anonymizer server. The anonymizer server is communicatively coupled to a data repository configured to store a personal identification information (PII) data. The anonymizer server is configured to perform operations including receiving a repository configuration request comprising an anonymized data schema, and creating an anonymized data repository clone based on the anonymized data schema. The anonymizer server is also configured to perform operations including anonymizing the PII data to create an anonymized data by applying a one-way data masking, a one-way data morphing, or a combination thereof, and storing the anonymized data in the anonymized data repository clone.

17 Claims, 7 Drawing Sheets

(56) References Cited

U.S. PATENT DOCUMENTS

| | | | |
|---|---|---|---|
| 8,832,652 | B2 | 9/2014 | Mueller |
| 8,949,209 | B2 | 2/2015 | Khin et al. |
| 9,065,783 | B2 | 6/2015 | Ding |
| 9,098,322 | B2 | 8/2015 | Apte |
| 9,122,552 | B2 | 9/2015 | Whitney |
| 9,298,941 | B2 | 3/2016 | Stotberg et al. |
| 9,317,327 | B2 | 4/2016 | Apte |
| 9,363,252 | B2 | 6/2016 | Mueller |
| 9,535,737 | B2 | 1/2017 | Joy |
| 9,645,833 | B2 | 5/2017 | Mueller |
| 9,654,473 | B2 | 5/2017 | Miller |
| 9,766,935 | B2 | 9/2017 | Kelkar |
| 9,805,322 | B2 | 10/2017 | Kelkar |
| 2013/0198194 | A1* | 8/2013 | Chen .................. G06F 21/6254 707/740 |
| 2019/0228183 | A1 | 7/2019 | Choi et al. |

OTHER PUBLICATIONS

Ravikumar; "A Survey on Recent Trends, Process and Development in Data Masking for Testing"; IJCSI International Journal of Computer Science Issues ISSN, Mar. 15, 2011, pp. 1694-1814 (XP055350766).

Extended European Search Report for European Patent Application No. 19192449.7 dated Nov. 5, 2019; 8 pgs.

Kerkri et al.; "An approach for integrating heterogeneous infromation sources in a medical data warehouse", Journal of Medical Systems, vol. 25, No. 3, pp. 167-187; [https://link.springer.com/journal/10916/volumnes-and-issues/25-3, Jun. 1, 2001].

\* cited by examiner

| | | =AGE | =CAPITAL_GAIN | =CAPITAL_LOSS | =CLASS | =COUNTRY | =EDUCATION | =EDUCATIONNUM | =HOURS | =MARITA |
|---|---|---|---|---|---|---|---|---|---|---|
| | SEARCH | SEARCH | SEARCH | SEARCH | SEARCH | SEARCH | SEARCH | SEARCH | SEARCH | SEARCH |
| ☐ | ⊖ | 90 | 0 | 0 | <=50K | UNITED-STATES | HS-GRAD | 9 | 40 | MARRIED- |
| ☐ | ⊖ | 90 | 9,386 | 0 | >50K | UNITED-STATES | BACHELORS | 13 | 15 | MARRIED- |
| ☐ | ⊖ | 90 | 6,767 | 0 | <=50K | UNITED-STATES | HS-GRAD | 9 | 40 | MARRIED- |
| ☐ | ⊖ | 90 | 10,566 | 0 | <=50K | UNITED-STATES | BACHELORS | 13 | 50 | NEVER-M |
| ☐ | ⊖ | 90 | 0 | 0 | <=50K | UNITED-STATES | HS-GRAD | 9 | 24 | NEVER-M |
| ☐ | ⊖ | 90 | 20,051 | 0 | >50K | UNITED-STATES | MASTERS | 14 | 60 | MARRIED- |
| ☐ | ⊖ | 90 | 0 | 0 | <=50K | UNITED-STATES | SOME-COLLEGE | 10 | 35 | NEVER-M |
| ☐ | ⊖ | 90 | 2,964 | 0 | >50K | UNITED-STATES | MASTERS | 14 | 50 | NEVER-M |
| ☐ | ⊖ | 90 | 0 | 0 | <=50K | UNITED-STATES | HS-GRAD | 9 | 12 | NEVER-M |
| ☐ | ⊖ | 90 | 0 | 0 | <=50K | UNITED-STATES | SOME-COLLEGE | 10 | 37 | DIVORCED |
| ☐ | ⊖ | 90 | 20,051 | 0 | >50K | UNITED-STATES | MASTERS | 14 | 40 | MARRIED- |
| ☐ | ⊖ | 90 | 0 | 0 | >50K | UNITED-STATES | PROF-SCHOOL | 15 | 72 | MARRIED- |
| ☐ | ⊖ | 90 | 0 | 0 | <=50K | UNITED-STATES | BACHELORS | 13 | 45 | MARRIED- |

SYSTEM AND METHOD FOR ANONYMIZED DATA REPOSITORIES

BACKGROUND

The present disclosure relates generally to data repositories and, more particularly, to anonymized data repositories.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions for data repositories, users may be asked to deal with ever increasing amounts of data, e.g., including certain Personally Identifiable Information (PII) stored in the data repositories. In fact, the amount of cloud-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of data to properly and efficiently perform their job functions. In certain embodiments, cloned data repositories may be created. With this in mind, the following embodiments are directed to improving the manner in which PII data may be derived for certain data repositories, including cloned data repositories.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized systems and methods to anonymize such data, creating anonymized clones of certain databases, including cloud-based databases. More specifically, the techniques described herein may include data transformations that transform the Personally Identifiable Information (PII) in a non-anonymized data repository into information that no longer identifies the individual or entity and saves the transformed information in the anonymized data repository clone or instance. I some embodiments, the newly anonymized data repository include a desired k-anonymity based on an l-diversity input value, as further described below.

BRIEF DESCRIPTION OF THE DRAWINGS

Various aspects of this disclosure may be better understood upon reading the following detailed description and upon reference to the drawings in which:

FIG. 6 is a screenshot of an embodiment of a graphical user interface (GUI) showing a view of certain non-anonymized data in accordance with an embodiment; and FIG. 7 is a screenshot of an embodiment of a graphical user interface (GUI) showing a view of certain anonymized data in accordance with an embodiment.

DETAILED DESCRIPTION OF SPECIFIC EMBODIMENTS

Figure 1:
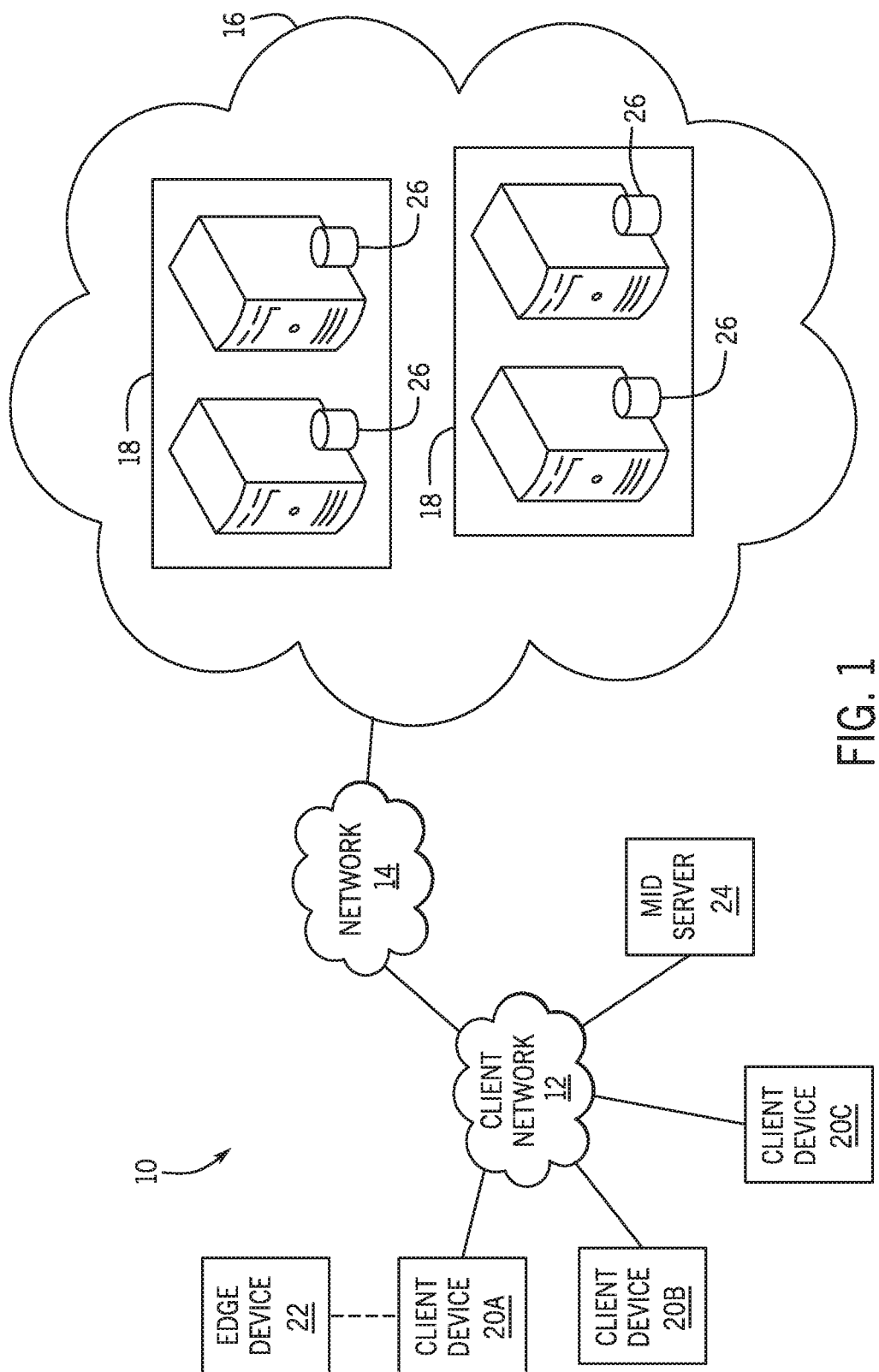
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "Personally Identifiable Information (PII)" may refer to data that includes information that may identify certain entities, including users, and that may fall under regulatory purview, such as under the United States' Health Insurance Portability and Accountability Act (HIPAA), the European Union (EU) data protection directives (e.g., Directive 95/46/EC), and so on.

As used herein, data anonymization refers to the removal of PII from a data set to create an anonymous dataset. The techniques described herein may use l-diversity and k-anonymity as measure of anonymity. As used herein, l-diversity measures include l so that if you let a q*-block be a set of tuples such that its non-sensitive values generalize to q*, a q*-block is l-diverse if it contains l "well represented" values for the sensitive attribute S. A table is l-diverse, if every q*-block in it is l-diverse. In other words, it would be preferable to require that a q*-block has at least l≥2 different sensitive values such that the l most frequent values (in the q*-block) have roughly the same frequency. We can then say that such a q*-block is "well-represented" by l sensitive values. Datasets may be set to be "k-anonymous" when for any given quasi-identifier (e.g., one or more columns in a database table or combination of columns), a record is indistinguishable from k−1 others.

Present embodiments are directed creating one or more anonymized data repository clones or instances from a non-anonymized data repository. More specifically, the techniques described herein may include data transformations, such as one-way data transformations that transform PII in a non-anonymized data repository into information that no longer identifies an individual or entity (i.e., anonymous data), and saves the transformed information in the anonymized data repository clone or instance. As used herein, "one-way" data transformations may include data masking and/or data morphing, as well as one-way functions, such as cryptographic hash functions, Rabin functions, elliptic curve functions, and the like, that transform an input (e.g., character string, number, data array, and so on) into an output data such that retrieving the original input from the output data may be computationally "hard", e.g., non-deterministic polynomial-time (NP) hard, NP complete, or in general, too computationally intensive to be practical. Applying the one-way data transformations may thus render the input data anonymous.

In certain embodiments, the user may input an l-diversity value for a given data set. The techniques described herein may then derive a minimum K-value (e.g., K-anonymity value), achievable for the data set. The user may decide, for example, based on the derived K-value, to add synthetic data to further anonymize the data set. The non-anonymous data may then be anonymized based on user selection, including the use of masking, grouping, and/or data morphing, such that the anonymized data cannot be used to, for example, to recreate the PII In the original non-anonymous data.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, in which embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

The virtual servers 26 may store or access a variety of data, including data that may have Personally Identifiable Information (PII). For example, names, identification data, addresses, medical history, financial history, credit history, employment history, and so on, may be considered PII in certain jurisdictions. Indeed, certain regulations, such as the United States' Health Insurance Portability and Accountability Act (HIPAA), the European Union (EU) data directives, and the like, may specify that some data is to be considered as PII.

To utilize computing resources within the platform 16, network operators may choose to configure the data centers 18 using a variety of computing infrastructures. In one embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
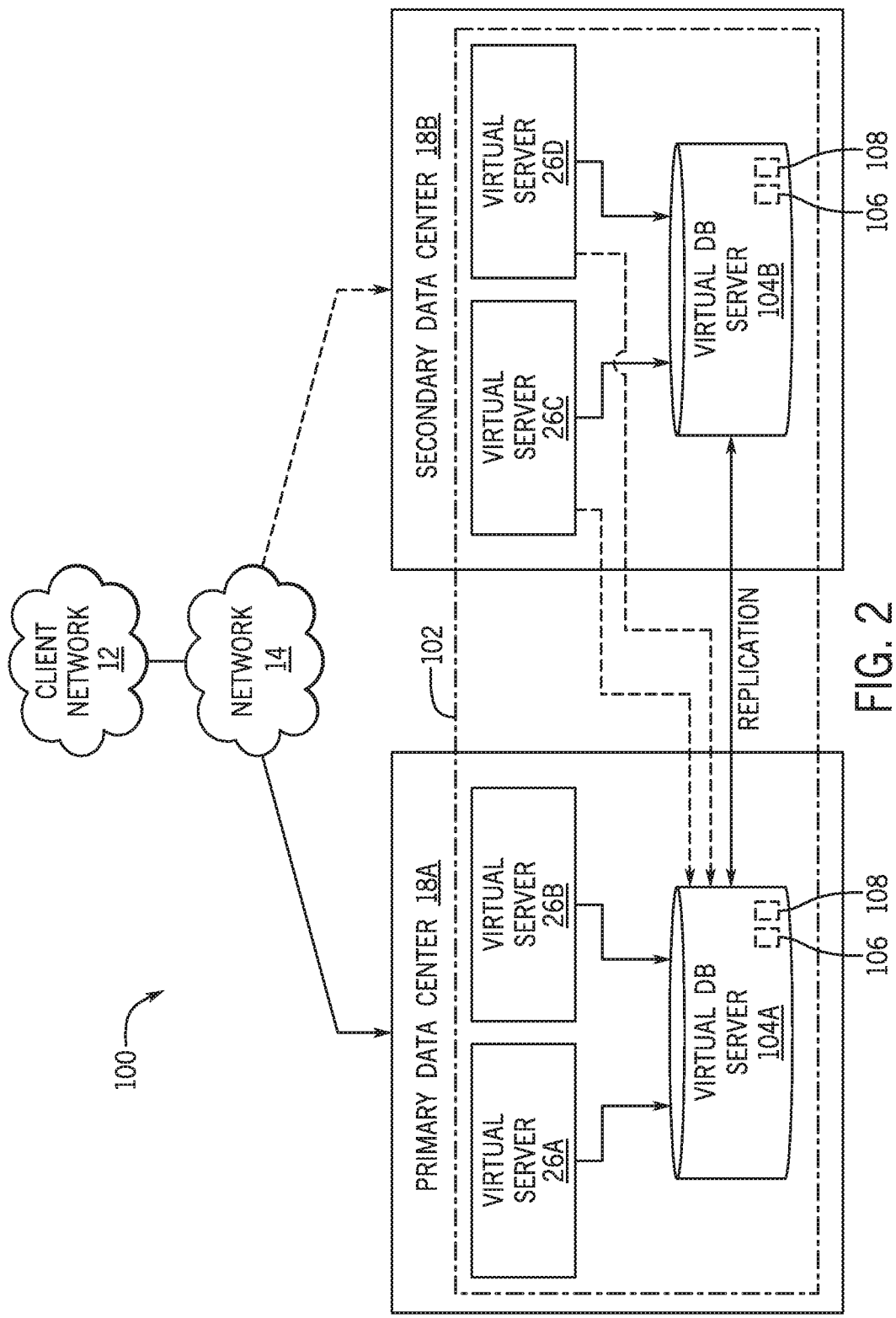
FIG. 2 is a block diagram of a computing device utilized in the distributed computing system of FIG. 1, in accordance with an embodiment.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a simply client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B.

As shown in FIG. 2, the primary virtual database server 104A may replicate data to the secondary virtual database server 104B using, e.g., a Master-Master MySQL Binlog replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

In the depicted embodiment, a database server, such as the servers 104A and/or 104B, may include non-anonymized data 106 having PII. That is, the non-anonymized data 106 may be a data set that may have both non-PII but also PII records. The techniques described herein may transform the non-anonymized data 106 into anonymized data 108. For example, data masking, data morphing, data grouping, and the like, may be applied to the non-anonymized data 106 to create the anonymized data 108. The anonymized data 108 may then be used by other processes.

For example, the anonymized data 108 may be used for deep learning, for statistical analysis, for model building (e.g., building neural networks, data mining models, state vector machine models, statistical models, and so on), and the like, useful in deriving information for a variety of purposes, including business, finance, medical, engineering, construction, and so on. It is also to be understood that the techniques described herein work with any type of database, virtual or otherwise. For example, the non-anonymized data 106 may reside in one database (physical and/or virtual database) and then be converted to anonymized data 108 and stored in a second different database (physical and/or virtual database) and/or also stored in the first database. Indeed, the anonymization techniques may be executed in a server that may be communicatively coupled with and/or that includes the first database, and then the anonymized data 108 may be saved in the first and/or second database also communicatively coupled to the server, such as the servers 104A, 104B.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
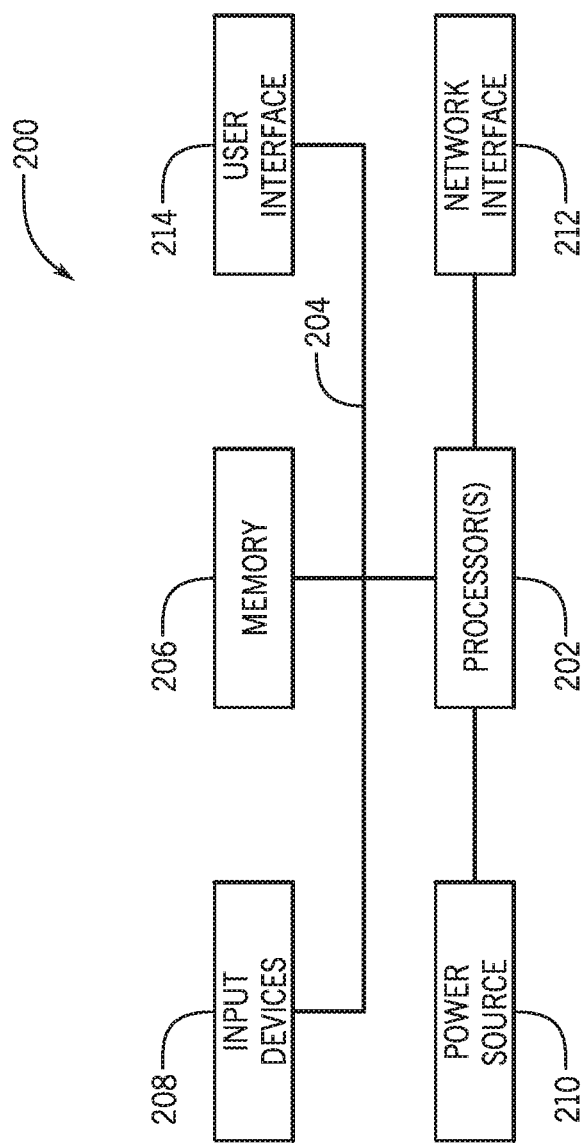
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
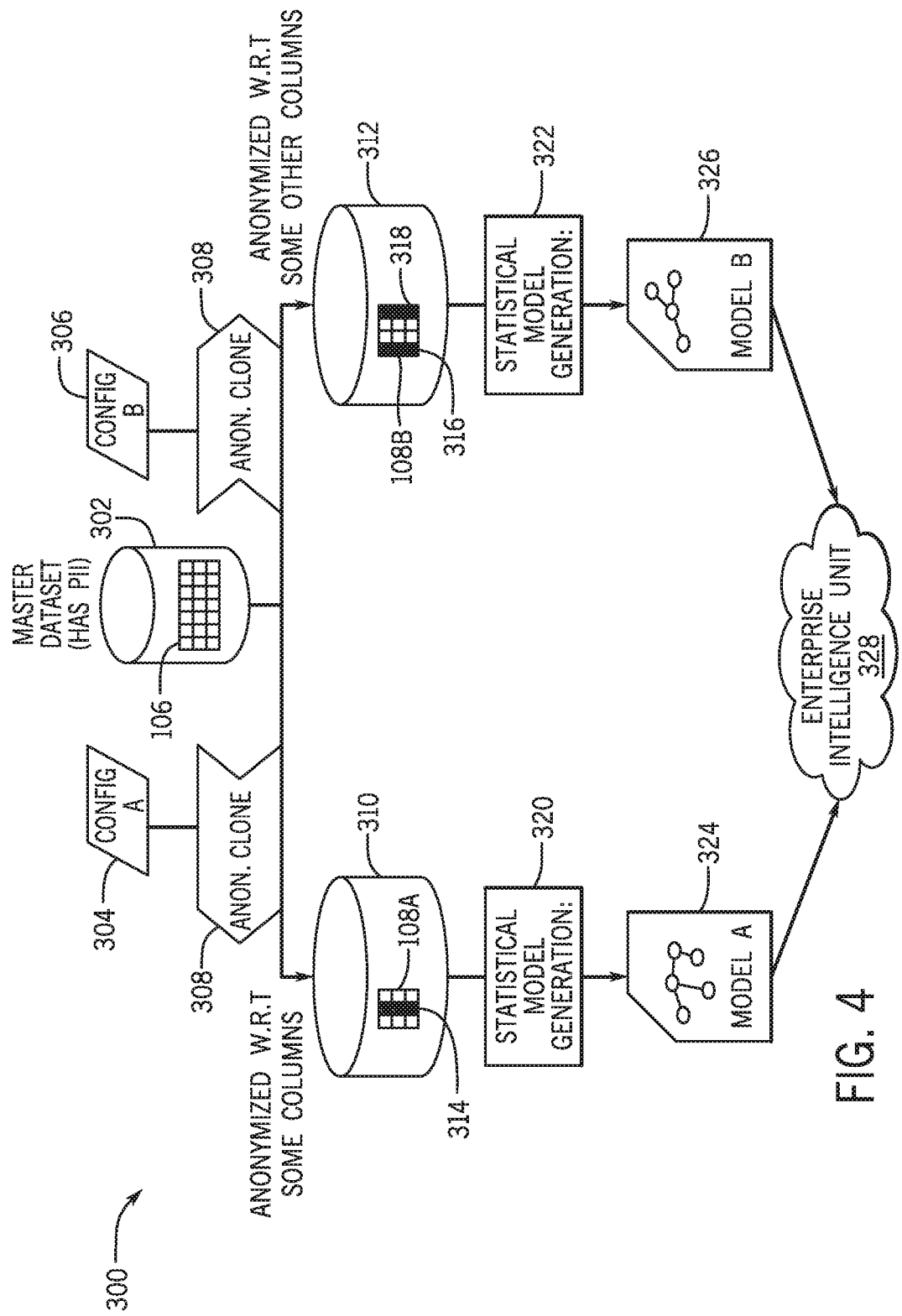
FIG. 4 is an information flow diagram illustrating a process that may be used to transform non-anonymous data into anonymous data, in accordance with an embodiment.

Turning now to FIG. 4, the figure is an information flow diagram illustrating an embodiment of a process 300 that may be used to transform the non-anonymous data 106 into the anonymous data 108. In the illustrated embodiment, a master dataset 302 includes the non-anonymous data 106. The master dataset 302 may be communicatively coupled to the servers 104 and/or included in the servers 104. A user, such as an information technologist, may create one or more configuration files, such as configuration files A 304, B 306, suitable for anonymizing the non-anonymous data 106. The configuration files A 304 and B 306 may each define a different subset of data in the master dataset 302 to use. The configuration files A 304 and B 306 may include tables, views (e.g., SQL-based views), columns, rows, and the like, to anonymize via the techniques described herein. It is also to be understood that a graphical user interface (GUI), for example, displayable via the user interface 214 may be used to enable the user to input desired anonymization data such as the data subset of the non-anonymized data 106 to use, the type of anonymization to use as further described below, and so on. The GUI may also be used to collect the input data that may then result in the configuration files A 304 and B 306.

The user input for anonymization may include an l-diversity value to strive for once the data is anonymized. The l-diversity value may be used by the server 104 to derive or to attempt to derive a k-anonymized dataset such that each set of k similar records in the k-anonymized dataset will have at least l different or diverse representations for each identifying value (e.g., PII cell). More specifically, combinations of attributes within the data may be used to identify individuals. For example, a statistic given is that 87% of the population of the United States may be uniquely identified by gender, date of birth, and 5-digit zip code. Given a three-attribute "quasi-identifier" based on gender/date of birth/zip code, a dataset that has only one record with any given combination of these three fields is not anonymous, it most likely it identifies someone. Datasets are "k-anonymous" when for any given quasi-identifier (e.g., one or more columns in a database table or combination of columns), a record is indistinguishable from k−1 others.

A similar concept is "l-diversity." If one has a group of k different records that all share a particular quasi-identifier, an attacker usually cannot identify an individual based on the quasi-identifier. But if the value the attacker is interested in, in, for example the individual's medical diagnosis, is the same for every value in the group, then the individual may be identified. In one example there may be 7 different values in a group, and the attacker doesn't know which one of them is the person called Adam, but since the attacker knows that all of them are flagged with a diagnosis of cancer, the data has "leaked" that Adam has cancer. This type of attack is usually referred to as a "homogeneity attack." The distribution of target values within a group may be referred herein as "l-diversity". Formally, a definition for an l-diversity value may state that if you let a q*-block be a set of tuples such that its non-sensitive values generalize to q*. A q*-block is l-diverse if it contains l "well represented" values for the sensitive attribute S. A table is l-diverse, if every q*-block in it is l-diverse.

In some embodiments, the l-diversity value inputted by the user may be then used to derive a minimum k-value that could be realized when creating the anonymized data 108 from the non-anonymized data 106, thus helping enable anonymity and preventing homogeneity attacks. To derive the minimum k-value, the techniques described herein may, in one embodiment, use clustering techniques to group the data selected for anonymization. The grouped data may then be analyzed to determine a minimum k-value to achieve the desired l-diversity value. For example, the group may be anonymized as desired by the user and then a minimum k-value and l-diversity value may be computed.

The user inputs may also include a type of transformation to apply to the data for anonymization. For example, the user may desire to apply a data masking. In data masking, the format of data remains mostly the same; but the data values are changed. The data may be altered in a number of ways, including encryption, character shuffling, and character or word substitution, to provide for a one-way data transformation. Whatever one-way data transformation is chosen, the values are changed in some way that prevents retrieving the original data from the now-transformed data. For example, every character in a name may be replaced by the single 'special' character, such as '*' (or multiple special characters). Thus, "Andrew" would be transformed to "*" and "Betany" would also be transformed to "*", thus providing for a one-way data masking transformation. Special characters may include '*', '#', '@', and so on.

The user may also desire to apply data morphing. In data morphing, the format of the data may change, while the data values may also change. For example, data may be encrypted, the data may be processed using a hash function, and so on, to provide for a one-way data transformation. Data grouping may also be used to provide anonymization. In grouping, a data record may be changed to reflect an inclusive group that the record belongs to. In other words, related fields in the PII data are grouped into a single field in the anonymized data. For example, data records, "United States", "Mexico", and "Canada" may be all changed to say "North America" because they all are in the North American group of countries. As in data masking, data morphing and data grouping may be one-way data transformations.

In the embodiment depicted in FIG. 4, the user may use the GUI and/or the configuration files A 304, B 306 to extract and clone data via an anonymization clone process 308 from the dataset 302 into datasets 310 and 312 as anonymized data 108A and 108B. Indeed, the non-anonymized data 108 may be divided into more than one anonymized data sets, such as datasets 310 and 312. It is to be understood that the anonymized data sets may include data (e.g. columns, rows) that have been transformed via one-way data transformations, as well as data that have not been transformed and contain data originally found in the non-anonymized data 106. As illustrated columns 314, 316, and 318 contain PII in the original dataset 106 and are thus shown as anonymized in the datasets 310, 312.

The anonymized data 108 may then be used for a variety of data analysis. For example, model generation processes 320 and 322 may result in the creation of model A 324 and model B 326, respectively. The model generation processes 320 and 322 may include a variety of modeling process that may be applied for data analysis, such as statistical modeling, deep learning, neural network modeling, state vector machine (SVM) modeling, data mining modeling, physical modeling (e.g., thermodynamic modeling, finite element analysis modeling), and so on. Once the models 324, 326 are created, the models may be used by an enterprise intelligence unit 328 to derive a variety of results, such as medical results, business results, engineering results, econometric results, and so on.

Figure 5:
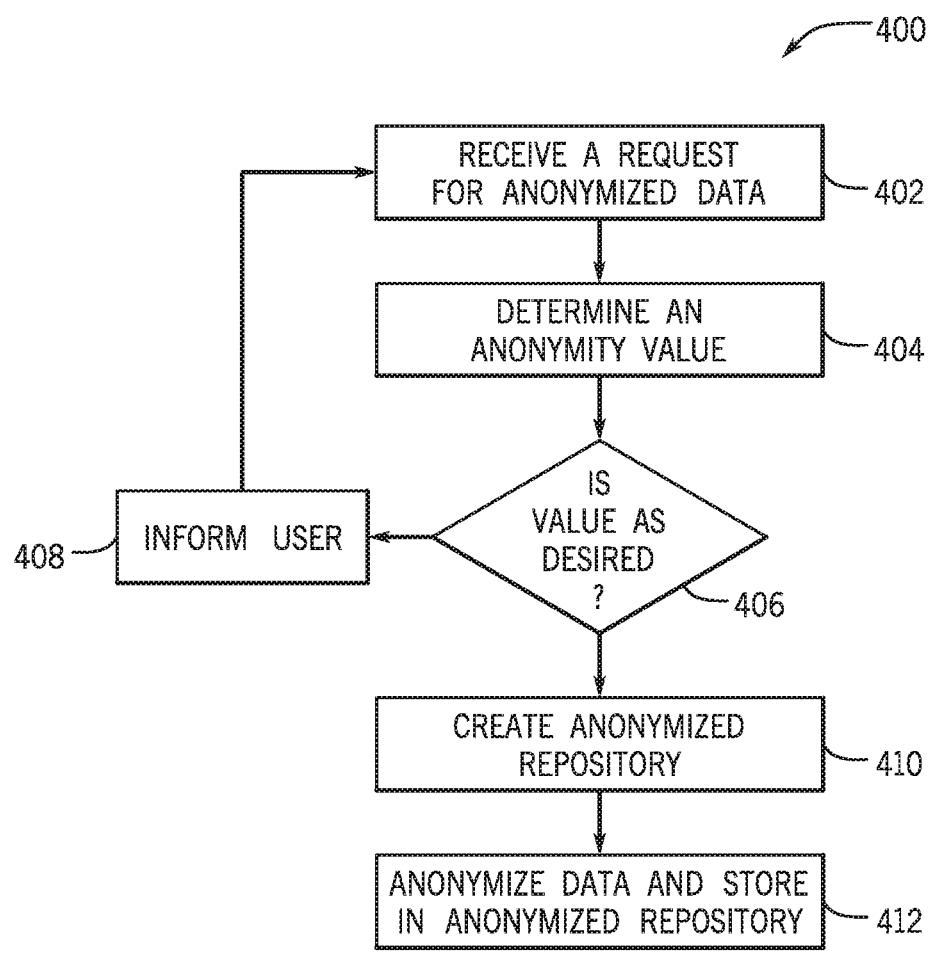
FIG. 5 is a flowchart depicting a process suitable for creating an anonymized clone from a non-anonymized data repository, in accordance with an embodiment.

FIG. 5 is a flowchart depicting an embodiment of a process 400 suitable for creating an anonymized clone from a non-anonymized data repository. The process 400 may be implemented as executable computer instructions or code executable, for example, via physical and/or virtual servers 26. In the depicted example, the process 400 may first receive (block 402) a request for the creation of an anonymized data 108. For example, a request to create an anonymized clone having anonymized data 108 may be received. The request may include a database table having PII columns to anonymize, a view (e.g., SQL-based view), a set of columns, rows, and so on, which may be based on the non-anonymized data 106. The request may also include data transformations to apply to the PII columns, such as data masking, data morphing, data grouping, and so on. The request may additionally include a desired l-diversity value and/or k-anonymity value for the anonymized data 108.

The process 400 may then determine (block 404) an anonymity value based on the request. For example, if the user requests a desired l-diversity value, the process 400 may then determine a minimum k-anonymity value that could be achieved with the current data 106. The process 400 may additionally verify that the selected l-diversity value would be possible given the data set to be anonymized, e.g., data 106. If the selected l-diversity value(s) is not feasible (decision 406), the process 400 may then inform (block 408) the user. The user may then change the request and resubmit the request (block 402) for example, to include the addition of synthetic data. For example, once informed that the selected value(s) for anonymization (e.g., l-diversity value, k-anonymity value) aren't feasible, the user may request the addition of synthetic data (e.g., data created with random values) so that the desired anonymization values are reached.

If it is determined (decision 406) that the anonymity values would be useful, the process 400 may then apply certain anonymization techniques, e.g., data masking, data morphing, data grouping, or a combination thereof, to the selected column(s) of the non-anonymized data 106. Accordingly, the process 400 may create (block 410) one or more anonymous repositories (e.g., datasets 310, 312) and the selected anonymization techniques may be used to anonymize the data 106 into the anonymized data 108 and store (block 412) the now anonymized data 108 in the anonymized repositories. It is to be noted that the anonymized data 108 may additionally or alternatively be stored in a temporary memory (e.g., RAM, temporary file, and so on). As mentioned earlier, the anonymized repository may be used for a variety of purposes, including medical analysis, business analysis, engineering analysis, econometrical analysis, and so on. By providing for anonymous data 108, the analysis may comply with privacy laws and regulatory entities in various jurisdictions.

It is also to be noted that the creation of the anonymous data 108 may be done as part of a software component. For example, the software component may be a function, a class, a module, and so on, that may execute the process 400. The software component may take as input the configuration files 304, 306, the l-diversity value, the k-anonymity value, the type of anonymity transformation to apply (e.g., data mapping, data morphing, and/or data grouping) and so on, and then as output create the anonymized data 108. Accordingly, the software component may be used as part of any software process that would benefit from anonymization. By calling the software component, a variety of processes may more easily derive the anonymized data 108.

FIG. 6 is a screenshot of an embodiment of a graphical user interface (GUI) 450 showing a view of certain non-anonymized data 452 which may be stored, for example, in the dataset 302. The non-anonymized data 452 illustrated may be a data portion of the non-anonymized data 106. In the depicted embodiment, a first section 454 may be used to navigate the non-anonymized data 452 while second section 456 may be used to display various columns and rows of the non-anonymized data 452. As depicted, columns 458, 460, 462, 464, 466, 468, 470, and 472 contain data that may remain non-anonymous, while column 474 contains PII that would benefit from anonymity. As mentioned earlier, the user may select one or more columns, rows, and the like to anonymize via the techniques described herein.

In certain embodiments, the user may select column 474 (and other columns) and then select a type of anonymization technique to use, such as data masking, data morphing, data grouping, or a combination thereof. The user may also enter an l-diversity value to be achieved by the anonymization for the resulting anonymized data 108. A computing system such as the virtual server may then analyze the data 452 to determine a minimum k-anonymity value that could be provided by the data 452. The user may then opt to proceed with the anonymization or opt to add synthetic data to the anonymization to increase the l-diversity and/or k-anonymity values. The virtual server 26 may then anonymize the data, as shown in FIG. 7.

Figure 7:
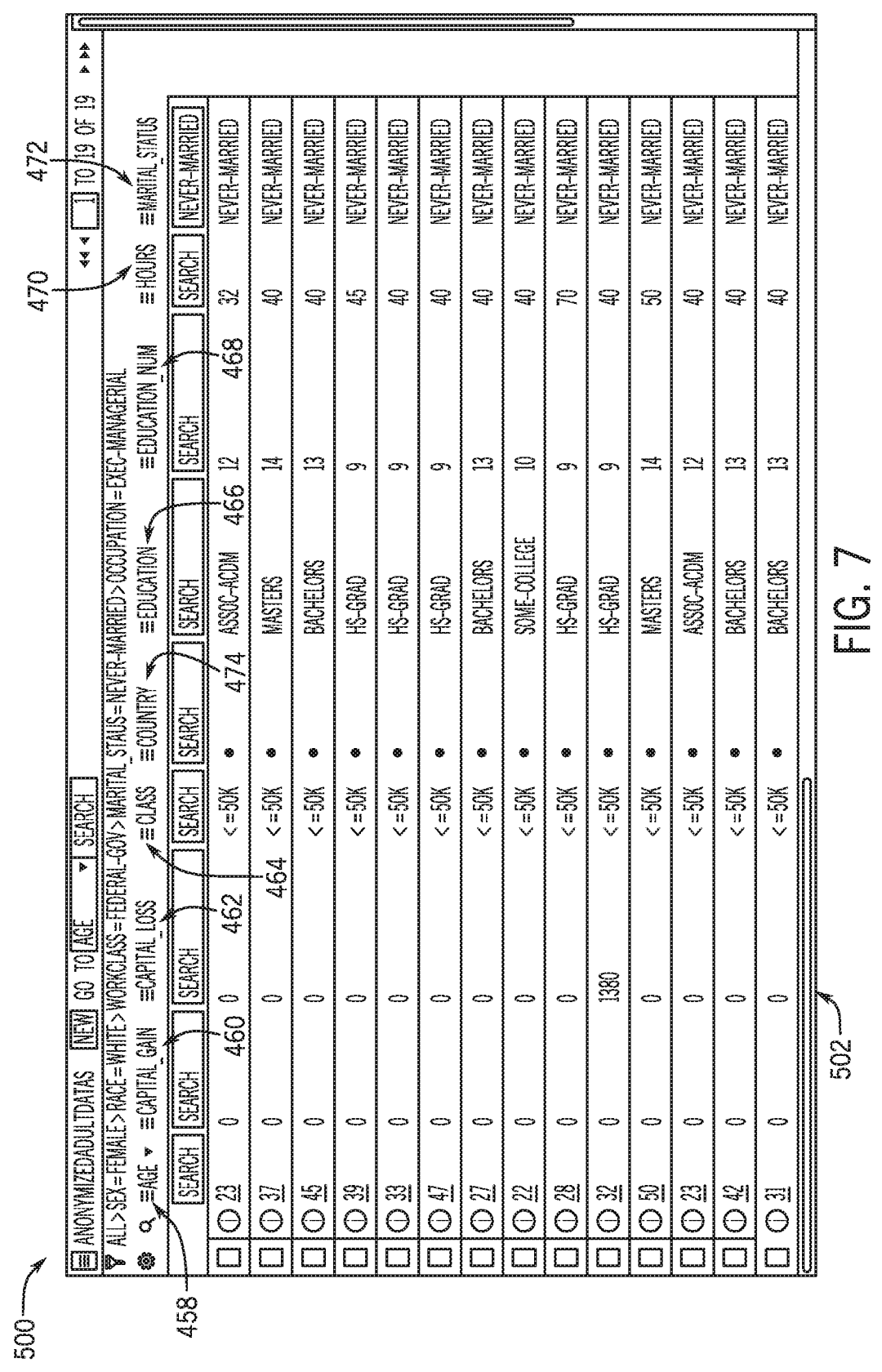

More specifically, FIG. 7 is a screenshot of an embodiment of a graphical user interface (GUI) 500 showing a view of certain anonymized data 502 based on the non-anonymous data 452. More specifically, FIG. 7 shows the results of data masking with a single character '*' used as a mask over the column 474. Also shown are non-anonymized columns 458, 460, 462, 464, 466, 468, 470, and 472 that did not undergo anonymization, and are thus readable. Now anonymized, the data 502 may be compliant with a variety of privacy regulations, including HIPAA, the EU's data protection directives, and the like. The data 502 may then be further distributed to enterprise intelligence units 328, for example, for data analysis.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
an anonymizer server computer communicatively coupled to a data repository configured to store a personal identification information (PII) data, wherein the anonymizer server computer is configured to perform operations comprising:
receiving a repository configuration request comprising an anonymized data schema and an l-diversity value for an anonymized data repository clone;
creating the anonymized data repository clone based on the anonymized data schema and the l-diversity value;
anonymizing the PII data to create an anonymized data by applying a one-way data masking, a one-way data morphing, or a combination thereof; and
storing the anonymized data in the anonymized data repository clone.

2. The computing system of claim 1, wherein the anonymizer server computer is configured to derive a minimum k-homogeneity value based on the l-diversity value.

3. The computing system of claim 1, wherein the anonymizer server computer is configured to add a synthetic data to the first anonymized data repository clone to achieve the l-diversity value.

4. The computing system of claim 1, wherein the anonymizer server computer is configured to perform operations comprising:
receiving a second repository configuration request comprising a second anonymized data schema;
creating a second anonymized data repository clone based on the second anonymized data schema;
anonymizing the PII data to create a second anonymized data by applying one-way data masking, a one-way data morphing, or a combination thereof; and
storing the second anonymized data in the second anonymized data repository clone.

5. The computing system of claim 1, comprising a modeling system configured to derive a data analysis model based on the anonymized data repository.

6. The computing system of claim 5, comprising an enterprise intelligence system configured to use the data analysis model as an input to derive at least one predictive output.

7. The computing system of claim 1, wherein the one-way data masking comprises replacing the PII data with one or more special characters to create the anonymized data.

8. The computing system of claim 1, wherein the one-way data morphing comprises encrypting the PII data, applying a hash function to the PII data, or a combination thereof, to create the anonymized data.

9. The computing system of claim 1, wherein anonymizing the PII data to create the anonymized data comprises applying the one-way data masking, the one-way data morphing, a data grouping, or a combination thereof, and wherein applying the data grouping comprises grouping related fields in the PII data into a single field in the anonymized data.

10. A method, comprising:
receiving, at an anonymizer server communicatively coupled to a data repository configured to store a personal identification information (PII) data, a repository configuration request comprising an anonymized data schema and an l-diversity value for an anonymized data repository clone;
creating, via the anonymizer server, the anonymized data repository clone based on the anonymized data schema and the l-diversity value;
anonymizing, via the anonymizer server, the PII data to create an anonymized data by applying one-way data masking, a one-way data morphing, or a combination thereof; and
storing, via the anonymizer server, the anonymized data in the anonymized data repository clone.

11. The method of claim 10, comprising deriving, via the anonymizer server, a minimum k-homogeneity value based on the l-diversity value.

12. The method of claim 10, comprising adding, via the anonymizer server, a synthetic data to the first anonymized data repository clone to achieve the l-diversity value.

13. The method of claim 10, comprising:
receiving, at the anonymizer server, a second repository configuration request comprising a second anonymized data schema;
creating, via the anonymizer server, a second anonymized data repository clone based on the second anonymized data schema;
anonymizing, via the anonymizer server, the PII data to create a second anonymized data by applying one-way data masking, a one-way data morphing, or a combination thereof; and
storing, via the anonymizer server, the second anonymized data in the second anonymized data repository clone.

14. A non-transitory, computer-readable medium storing instructions executable by a processor of a computing system, wherein the instructions, when executed by the processor, cause the processor to perform acts comprising:
receiving, at an anonymizer server communicatively coupled to a data repository configured to store a personal identification information (PII) data, a repository configuration request comprising an anonymized data schema and an l-diversity value for an anonymized data repository clone;
creating an anonymized data repository clone based on the anonymized data schema and the l-diversity value;
anonymize the PII data to create an anonymized data by applying one-way data masking, a data morphing, or a combination thereof; and
storing the anonymized data in the anonymized data repository clone.

15. The computer-readable medium of claim 14, wherein the instructions are configured to derive a minimum k-homogeneity value based on the l-diversity value.

16. The computer-readable medium of claim 14, wherein the instructions are configured to add a synthetic data to the first anonymized data repository clone to achieve the l-diversity value.

17. The computer-readable medium of claim 14, wherein the instructions, when executed by the processor, cause the processor to perform further acts comprising:
receiving, at the anonymizer server, a second repository configuration request comprising a second anonymized data schema;
creating a second anonymized data repository clone based on the second anonymized data schema;
anonymizing the PII data to create a second anonymized data by applying one-way data masking, a one-way data morphing, or a combination thereof; and
storing the second anonymized data in the second anonymized data repository clone.

* * * * *